United States Patent [19]

Chane-Ching et al.

[11] Patent Number: 5,795,486
[45] Date of Patent: Aug. 18, 1998

[54] USE OF BARIUM AND/OR STRONTIUM SULPHIDE TO REMOVE HEAVY METALS IN ACIDIC SOLUTIONS

[75] Inventors: Jean-Yves Chane-Ching, Eaubonne; Fabrice Fourcot, Velizy, both of France

[73] Assignee: Rhone-Poulenc Chimie, Courbevoie, France

[21] Appl. No.: 579,190

[22] Filed: Dec. 27, 1995

[51] Int. Cl.$^6$ ........................................... C02F 1/62
[52] U.S. Cl. ........................ 210/723; 210/912; 210/913; 210/914
[58] Field of Search ........................ 210/912, 913, 210/914, 723

[56] References Cited

U.S. PATENT DOCUMENTS

| | | | |
|---|---|---|---|
| 3,740,331 | 6/1973 | Anderson et al. | 210/912 |
| 4,102,784 | 7/1978 | Schlauch | 210/912 |
| 4,329,224 | 5/1982 | Kim | 210/912 |
| 4,422,943 | 12/1983 | Fender et al. | 210/912 |
| 4,432,880 | 2/1984 | Talbot | 210/912 |
| 4,814,091 | 3/1989 | Napier et al. | 210/912 |
| 4,861,493 | 8/1989 | Jansen | 210/912 |
| 5,035,807 | 7/1991 | Maree | 210/711 |
| 5,338,460 | 8/1994 | Yen | 210/912 |

FOREIGN PATENT DOCUMENTS

| | | | |
|---|---|---|---|
| 2178180 | 11/1973 | France | C02C 1/40 |
| 2252980 | 11/1973 | France | C01B 17/02 |
| 2429994 | 1/1975 | Germany | C02C 5/02 |
| 7304233 | 3/1973 | Netherlands | 210/912 |
| 0600092 | 7/1975 | U.S.S.R. | C02C 5/02 |

*Primary Examiner*—Neil McCarthy
*Attorney, Agent, or Firm*—Katherine L. Carleton

[57] ABSTRACT

The invention relates to the use of barium sulphide or strontium sulphide for the removal of heavy metals in industrial acidic solutions.

The invention is applicable to the purification of contaminated acids, in particular of spent battery acid, or of industrial solutions of titanyl sulphate.

7 Claims, No Drawings

USE OF BARIUM AND/OR STRONTIUM SULPHIDE TO REMOVE HEAVY METALS IN ACIDIC SOLUTIONS

The present invention relates to the removal of heavy metals in industrial acidic solutions.

In the text which follows, the expression "industrial acidic solution" is understood to refer to a solution originating from an industrial process in which the solvent consists essentially of sulphuric or hydrochloric acid at a quite high concentration compatible with an industrial use. These solutions are strongly acidic. As a guide, the concentration of free acid in these solutions is generally greater than about 50 g/l.

For various reasons, these solutions may contain impurities based on heavy metals which should be removed, in particular on account of their toxicity, in the course of the industrial process in order to ensure the purity of the final product or in order to recycle the said solution.

These solutions may be solutions consisting of contaminated acid which are recovered from various industrial processes. It may in particular be battery acid which it is desired to purify for the purpose of recycling.

These solutions may also be solutions obtained by dissolution using sulphuric acid of a solid material containing heavy metals or heavy metal compounds to be removed. Examples of such solutions which may be mentioned are sulphuric solutions derived from the titanium industry. The production of titanium oxide by the sulphuric process effectively consists in attacking the ore with sulphuric acid in order to obtain a sulphuric solution containing titanyl sulphate $TiOSO_4$, generally referred to as black liquor. Depending on the ore used, a black liquor containing a certain number of impurities may be obtained including metals classified in the category of heavy metals (Pb, As, Cd, etc.) which may be present in particular in ionic form or in the form of salts. During the subsequent hydrolysis of this solution for the purpose of obtaining titanium oxide, some of these heavy metals are found in the finished product. Since these heavy metals are toxic to man and to the environment, many applications using titanium oxide, in particular in the food industry, require the heavy metal content to be as low as possible.

Sulphuric or hydrochloric solutions are also prepared by dissolution using acid of solid materials during the treatment of spent catalysts. These alumina-based catalysts contain all sorts of contaminating elements which are removed in processes according to which the catalyst is dissolved in the acid and the resulting solution is freed of the contaminants and treated in order to upgrade the content, acid and aluminium, for example to a water-treatment product.

For these various industrial acidic solutions, it is important that the removal of the heavy metals does not bring about an additional contamination due to the reactant employed. In addition, it is desirable for the purified solutions to retain the properties necessary for their subsequent use, in particular the acidity and the stability of the species in solutions.

Among the conventional techniques for removing heavy metals from a solution, it is possible to use a technique of purification by precipitation of sulphides of the metals in question. This consists in introducing into the solution a sulphur-containing compound, usually $H_2S$ or $Na_2S$, which forms with the metal cation to be removed a precipitate which is separated from the solution.

However, in the case of industrial acidic solutions, this technique has hitherto remained inefficient for the removal of a certain number of metals and particularly lead, arsenic, zinc and nickel.

The aim of the invention is to provide a process which makes it possible to remove heavy metals from these industrial acidic solutions.

To this end, the subject of the invention is the use of barium sulphide, BaS, or of strontium sulphide, SrS, for the removal of heavy metals in industrial acidic solutions.

The reason for this use is that it has been found that the introduction of one of these sulphides into an acidic solution leads to the formation of a precipitate in the form of large, readily filtered-off particles which entrains the heavy metals present in solution out into a solid phase.

These two compounds BaS and SrS are particularly efficient at removing lead, arsenic, bismuth, antimony, tin, mercury, cadmium, copper, zinc and nickel.

The removal of heavy metals by barium sulphide or strontium sulphide applies to all types of industrial acidic solutions.

Such solutions may in particular be solutions consisting of contaminated sulphuric acid, contaminated hydrochloric acid or a mixture of contaminated sulphuric and hydrochloric acids.

In order to remove the heavy metals from an industrial acidic solution, the invention proposes a process according to which barium sulphide or strontium sulphide, or a mixture of BaS and SrS, is introduced into the said solution in stoichiometric excess relative to the target metal, and the precipitate formed is then separated off.

The barium sulphide or strontium sulphide may be introduced in solid form, for example as a powder, or in solution in a suitable solvent. The precipitate may be separated from the treated solution by any means known per se, in particular by decantation and filtration or by centrifugation.

The barium, or respectively the strontium, introduced into the solution to be treated is only found in trace amounts after the treatment and is thus almost completely removed with the heavy metal precipitate. The purification reactant according to the invention thus does not contaminate the treated solution.

This removal may be carried out under conditions, in particular of temperature and of contact time between the reactants before liquid/solid separation, which may readily be adapted to an industrial plant.

The barium sulphide, or respectively the strontium sulphide, may be used in very variable proportions relative to the metal to be removed. The amount introduced quite naturally depends on the degree of purity of the final solution desired for the purpose of a particular application.

Thus, the sulphide excess may be as low as 1.25 times the molar content of metal and allow satisfactory removal.

The reaction with the barium sulphide or the strontium sulphide may be performed at a temperature ranging from room temperature to more than 80° C.

The contact time between the reactants before liquid/solid separation may be very short and will be proportionally longer the higher the purity sought for the final solution.

Since the kinetics for the precipitation with barium sulphide or strontium sulphide are relatively slow, in order to achieve the desired purity, the contact time of the reactants may be reduced by using a larger excess of barium sulphide or strontium sulphide or by increasing the reaction temperature.

The operating conditions may thus be adjusted as a function of the industrial requirements.

Thus, according to a first embodiment of the invention, the purification of an industrial solution of titanyl sulphate is carried out using barium sulphide or strontium sulphide.

Among the metals removed by means of the use of BaS and/or SrS, it is more particularly sought to remove lead, arsenic, cadmium and antimony.

For this, barium sulphide or strontium sulphide or a mixture of these two compounds is advantageously introduced at a proportion of at least 30 times the molar content of metal to be removed into the solution. This value of 30 is advantageous for the removal of lead but may be reduced for the removal of the other metals without any loss in efficiency of the treatment.

The reaction temperature may be set within the range from room temperature to about 70° C.

The contact between the reactants may be very short and is preferably maintained for more than 60 minutes, more particularly for more than 90 minutes.

For example, an industrial solution of titanyl sulphate may be purified advantageously by introducing BaS and/or SrS at a proportion of at least 30 times the molar content of metal to be removed, at a temperature of 50° to 70° C and by maintaining the contact between the reactants for at least 90 minutes, preferably for about 240 minutes. These conditions make it possible to achieve a high final purity.

In order to maintain the contact between the reactants, the entire treatment may be carried out with stirring or the mixture may be stirred in a first stage and the reaction may then be left to continue while standing.

Lead, arsenic, cadmium or antimony is thus removed very advantageously, most particularly lead.

After filtration, the treated solution of titanyl sulphate contains only traces of lead, barium and/or strontium depending on the case, in an acceptable amount.

Owing to its treatment time and temperature conditions, this purification treatment may quite entirely be incorporated in a process for the production of titanium oxide.

In a second aspect of the invention, the purification of contaminated acid is carried out, in particular of contaminated sulphuric acid, contaminated hydrochloric acid or mixtures of contaminated hydrochloric and sulphuric acids, which may originate from acidic treatments of catalysts. The purification of contaminated sulphuric acid consisting of spent battery acid is similarly carried out. Spent battery acids conventionally have a chemical composition of the following type:

| | |
|---|---|
| $H_2SO_4$ | 80 to 300 g/l |
| Fe | 800 to 2000 mg/l |
| Zn | 500 to 4000 mg/l |
| Cu | 400 to 190 mg/l |
| Cd | 25 to 150 mg/l |
| Ni | 10 to 80 mg/l |
| Pb | <20 mg/l |

After treatment with barium sulphide or with strontium sulphide, the acid is freed of certain heavy metals without any appreciable loss of acidity and may thus be recycled for the same use.

The purification reactant is not found in the treated solution and thus does not itself contaminate the acid to be recycled.

The purified acid is moreover very stable over time, thereby facilitating its subsequent use.

This step of removal of certain heavy metal cations by BaS or SrS may be coupled with an additional step in the sequence for the treatment of residual sulphuric acid.

The barium sulphide or strontium sulphide is advantageously introduced into the sulphuric acid in stoichiometric excess relative to the metals to be removed. The excess, expressed by the ratio (sulphide introduced)/(metal), may be from 1.25 to 50.

The reaction may be performed within a wide temperature range from room temperature to 80° C.

The addition may take place in a single portion or continuously while keeping the acidic solution to be treated stirring. The treatment time may range from 30 minutes to 4 hours.

The precipitate is separated out in a known manner, in particular by decantation and filtration or by centrifugation.

When it is desired to remove one metal in particular from a solution containing other heavy metals, these other metals are also liable to react with BaS or SrS and thus to consume some of the reactant intended for the removal of the target metal. This should be taken into account for the determination of the excess BaS or SrS to be introduced.

It has moreover been found that the removal of heavy metal is substantially improved by introducing, at the same time as the barium sulphide or the strontium sulphide respectively, barium sulphate or strontium sulphate respectively. Furthermore, the heavy metal precipitate is more readily separated out, the decantation taking place more readily, thereby making it possible to reduce the amount of traces of barium, or of strontium respectively, in the filtered solution.

The amount of barium sulphate, or of strontium sulphate respectively, introduced depends in particular on the particle size and surface chemistry of the sulphate particles. For example, the sulphate may be introduced in a comparable amount to that of the sulphide used.

Preferably, the barium sulphate or strontium sulphate is present in the form of fairly large particles in order to be readily filtered off, that is to say larger than a few microns in size.

The invention is illustrated by the examples which follow.

EXAMPLE 1

In this example, a black liquor produced by the titanium industry, containing 20 mg/l of lead, is treated with solid barium sulphide.

This black liquor contains 200 g/l of titanyl sulphate expressed as weight of $TiO_2$ and 155 g/l of free sulphuric acid.

According to the invention, BaS is introduced into the said solution, at a temperature of 50° C., in a molar ratio of 58 relative to the lead. After stirring for 4 hours, the precipitate formed is filtered off and the filtrate is analysed in order to determine the percentage of lead removed from the solution, which is 94.8 %.

For comparison, the same solution was treated, varying the amount of BaS introduced, the reaction temperature and the contact time. The results of these various tests are collated in Table 1.

TABLE 1

| Test | BaS/Pb molar ratio | Temperature (°C.) | Contact time (min) | % Pb removed |
|---|---|---|---|---|
| 1 (a) | 56 | 20 | 60 | 17.3 |
| 1 (b) | 58 | 50 | 10 | 35.5 |
| 1 (c) | 61 | 50 | 60 | 86.4 |
| 1 (d) | 58 | 50 | 240 | 94.8 |
| 1 (e) | 10 | 50 | 240 | 56.3 |

These results illustrate the influence of the variation of each parameter on the purification yield.

It appears to be advantageous to exceed the stoichiometry considerably, since a reduced efficiency is found for a stoichiometric ratio of 10.

It should, however, be noted that this liquor also contains other heavy metals which are also partly precipitated, which thus partly explains the large stoichiometry required.

EXAMPLE 2

The same solution is treated with a 100 g/l solution of barium sulphide added such that the barium sulphide and the lead are in a molar ratio of 61.

The solution is filtered after stirring for 90 minutes and measurement reveals that 94 % of the lead has been removed.

EXAMPLE 3

The same solution is treated with strontium sulphide. To the solution, heated to 55° C., is added an amount of SrS equal to 75 times the molar content of lead in the solution. The solution is kept stirring for 1 hour and is then left to stand for 3 hours 30 minutes at 55° C. before being filtered while hot, through filters of porosity 0.45 μm.

Measurement of the filtrate then reveals that 94.1 % of the lead has been removed.

COMPARATIVE EXAMPLE 4

For comparison, the same solution was treated with other sulphur-based systems:

(a) a mixture of 50 mol % of sodium sulphide and 50 mol % of barium sulphide (b) a mixture of 50 mol % of iron sulphide and 50 mol % of barium sulphide (c) a mixture of 50 mol % of sodium sulphide and 50 mol % of barium chloride.

The operating conditions are given in Table 2, in which the results of Example 1(c) are repeated for comparison.

The stoichiometric excess is expressed by the molar ratio (sulphur introduced)/(lead present) in order for the data to be comparable.

TABLE 2

| | S/Pb molar ratio | Reactant | Contact time (min) | % of Pb removed |
|---|---|---|---|---|
| Example 1 (c) | 61 | BaS | 60 | 86.4 |
| Example 4 (a) | 62 | $Na_2S$ + BaS 50/50 | 60 | 62.5 |
| Example 4 (b) | 132 | FeS + BaS 50/50 | 60 | 61.7 |
| Example 4 (c) | 59 | $Na_2S$ + $BaCl_2$ 50/50 | 60 | 0 |

These results show the superiority of the barium sulphide reactant over the other reactants.

In particular, Example 4(b) shows that even by imposing a BaS excess greater than that of Example 1(c), but with introduction of BaS as a mixture with FeS, the removal of lead is less efficient than with pure barium sulphide.

Moreover, Example 4(c) shows that it is necessary to introduce the barium and the sulphur in the same compound in order to observe a precipitation.

EXAMPLE 5

An industrial solution of titanyl sulphate is purified by elimination (a) of antimony, (b) of arsenic and (c) of cadmium, while adding barium sulphide, at a proportion of 58 times the content of metal, to the solution at a temperature of 50° C. After stirring for 4 hours, the solutions are filtered and analysed.

The results are as follows:

(a) more than 93% of Sb is removed (b) more than 80% of As is removed (c) more than 85% of Cd is removed

EXAMPLE 6

The industrial solution of titanyl sulphate of Example 1 is treated with a mixture of 50% barium sulphide and 50% barium sulphate, in the form of particles larger than 5 μm in size.

The stoichiometric excess being expressed by the molar ratio (sulphide introduced)/(lead present), 75 times the lead content of treating reactant is introduced into the solution at a temperature of 55° C.

After stirring for 1 hour and standing for 3 hours 30 minutes, the solution is filtered and the residual content of lead and barium in the filtrate is measured. These results are given in Table 3, along with the values corresponding to the solution before treatment (blank test) and to the treatment with barium sulphide alone.

TABLE 3

| Treatment | BaS introduced (g/l) | $BaSO_4$ introduced (g/l) | Pb (mg/l) | Ba (mg/l) | Pb removed (%) |
|---|---|---|---|---|---|
| Blank | — | — | 20.5 | <0.85 | — |
| BaS | 1.24 | — | 2.22 | 8.1 | 89.2 |
| BaS/$BaSO_4$ | 1.267 | 1.303 | 1.88 | 6.6 | 90.8 |

These results show that by using a BaS/$BaSO_4$ mixture, more lead is removed while leaving fewer traces of barium.

EXAMPLE 7

In this example, spent battery acid of the following composition is purified:

| | |
|---|---|
| $H_2SO_4$ | 84 g/l |
| $Fe^{2+}$, $Fe^{3+}$ | 1800 mg/l |
| $Zn^{2+}$ | 700 mg/l |
| $Cu^{2+}$ | 175 mg/l |

In this test, it is sought to remove the copper from the solution. 200 ml of this spent acid are introduced into a pyrex reactor fitted with a Teflon mechanical stirrer, followed by addition in a single portion, with stirring, of 1.14 g of BaS, which corresponds to a BaS/Cu molar ratio of 12.

The stirring is maintained at room temperature for one hour. After the stirring is stopped, the mixture is left to stand at room temperature for two hours. The colour of the solid in suspension changes to brown over time. The solid is separated out by centrifugation (300 rev/min for 15 min) and then filtration on a filter of porosity 0.45 μm. The filtrate is stable over time.

The iron, zinc and copper contents of the filtrate are measured by atomic absorption and are given in Table 4, along with the sulphuric acid assay of the treated solution.

TABLE 4

| Composition of the solution | Before treatment | After treatment BaS/Cu = 12 | % removal of the metal (%) |
| --- | --- | --- | --- |
| $H_2SO_4$ | 84 g/l | 81.4 g/l |  |
| $Fe^{2+}$, $Fe^{3+}$ | 1800 mg/l | 1438 mg/l | 20 |
| $Zn^{2+}$ | 700 mg/l | 693 mg/l | 1 |
| $Cu^{2+}$ | 175 mg/l | <1 mg/l | 99 |

The copper is almost entirely removed without any appreciable loss in acidity.

By treating the spent acid with a larger excess of BaS (15.8 g), partial removal of the iron (33% removal) is moreover achieved.

EXAMPLE 8

In this example, a solution derived from the dissolution of a spent catalyst based on alumina and precious metals, contaminated with toxic metals, is purified using a mixture of sulphuric and hydrochloric acids.

This solution has the following composition:

| | |
| --- | --- |
| pH | 0.5 |
| $Al_2O_3$ | 6.5 % by weight |
| Cu | 20 mg/l |
| Zn | 100 mg/l |
| Ni | 540 mg/l |
| Cl$^-$ | 120 g/l |
| $SO_4^{--}$ | 100 g/l |

It is sought to remove the copper, the nickel and the zinc from the solution.

200 ml of this solution are introduced into a mechanically stirred pyrex reactor, followed by addition in a single portion, with stirring, of 8 g of barium sulphide.

The stirring is maintained at room temperature for one hour. The solution is then left to stand, without stirring, at room temperature for two hours.

After centrifugation, analysis of the supernatant solution gives the following contents:

| | |
| --- | --- |
| Zn | 5 mg/l |
| Ni | <1 mg/l |
| Cu | <1 mg/l |

Virtually all of the toxic metals targeted have thus been separated into a solid phase from the acidic solution treated.

What is claimed is:

1. A process for the removal of heavy metal from an industrial acidic solution comprising the steps of:

i) introducing a composition selected from the group consisting of barium sulphide and barium sulphate; strontium sulphide and strontium sulphate; and mixture of any of the aforementioned into said solution in stroichiometric excess relative to the metal; and ii) separating the precipitate thus formed.

2. The process of claim 1 wherein the heavy metal is selected from the group consisting of lead, arsenic bismuth, antimony, tin, mercury, cadmium, copper, nickel and zinc.

3. The process of claim 1 wherein said industrial acidic solution is selected from the group consisting of heavy metal contaminated sulphuric acid; heavy metal contaminated hydrochloric acid; and mixtures thereof.

4. The process of claim 1 wherein said industrial acidic solution contains titanyl sulphate.

5. The process of claim 1 wherein said composition is introduced in a proportion of from 1.25 to 50 times the molar content of said metal to be separated; and wherein said introduction takes place from about room temperature to about 80° C.

6. The process of claim 5 wherein said composition is introduced in a proportion at least 30 times the molar content of said metal to be separated; and wherein said introduction takes place from about room temperature to about 70° C.; and wherein the contact time of the composition with the industrial acidic solution is from about 30 minutes to about 4 hours.

7. The process of claim 1, wherein the industrial acidic solution has a concentration of free acid greater than about 50 g/l.

* * * * *